UNITED STATES PATENT OFFICE.

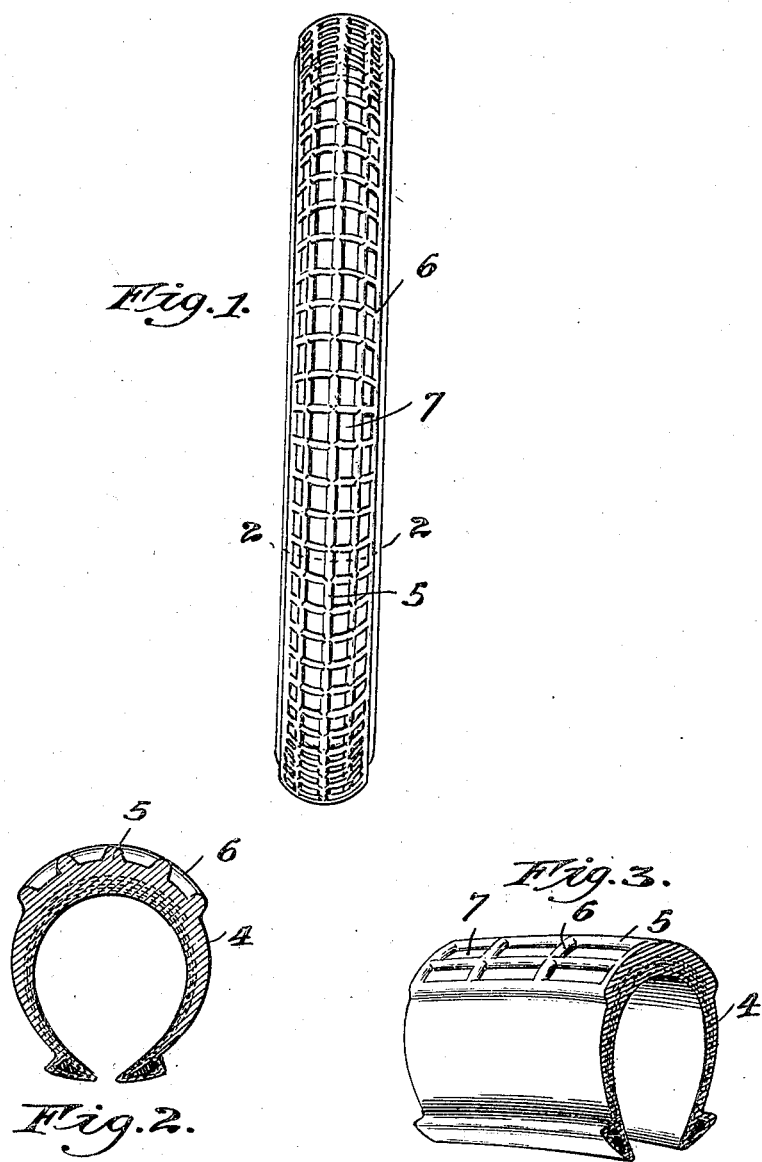

JOHN NEARY, OF KOKOMO, INDIANA, ASSIGNOR TO KOKOMO RUBBER COMPANY, OF KOKOMO, INDIANA, A CORPORATION OF INDIANA.

TIRE.

952,132.  Specification of Letters Patent.  Patented Mar. 15, 1910.

Application filed October 29, 1909. Serial No. 525,250.

*To all whom it may concern:*

Be it known that I, JOHN NEARY, a citizen of the United States, residing at Kokomo, in the county of Howard and State of Indiana, have invented certain new and useful Improvements in Tires, of which the following is a specification.

The invention relates in general to tires for use upon vehicles of all characters, but pertains more in particular to pneumatic tires adapted to be used upon motor vehicles.

The broad, general object of the invention is to provide a tire having a tread surface so designed and constructed as to prevent the "skidding" of the vehicle upon a slippery or loose surface.

The invention consists primarily in a tire having a series of circumferential ribs and a series of lateral ribs arranged at substantial right angles to the circumferential ribs and forming a multiplicity of rectangular cells on the tread of the tire, so as to prevent both forward slipping, when the brakes are applied, as well as a tangential slipping relative to the direction of motion of the vehicle.

In the accompanying drawing, Figure 1 is an end elevational view of my improved tire. Fig. 2 is an enlarged, sectional view on the line 2—2 of Fig. 1. Fig. 3 is a perspective, sectional view of a portion of my improved tire.

Referring now more particularly to the drawing, the body or tubular portion 4 of the tire is of the clencher type, the tread thereof being provided with a series of circumferential ribs 5 composed of rubber and formed integral with the body of the tire 4, there being preferably five of such circumferential ribs, although it is obvious that either more or less might be employed. Intersecting the circumferential ribs 5 are a plurality of lateral ribs 6, which are also preferably formed integral with the tire, and spaced apart a greater distance than said circumferential ribs so as to form a multiplicity of cells 7 upon the tread of the tire. The ribs are so designed and arranged that the cross or lateral ribs will prevent forward slipping of the tire, in the event that the brakes are applied to a vehicle, and also afford a better grip upon the traction surface, to increase the driving efficiency of the vehicle, whereas the circumferential ribs will prevent sidewise slipping or skidding of the wheels on a slippery or loose surface. In placing the ribs at substantially right angles to each other, and at short distances apart, a tire construction is provided whereby gravel or loose matter on the traction surface will not become wedged in the cells between the respective ribs so as to bore into the tire or be carried thereby, as is the case with most of the so-called "anti-skid" tires having projections upon the surface thereof, and for this reason the wearing qualities of a tire of my improved construction are materially increased with less injury to the road surface.

Having therefore described my invention and the advantages thereof, I claim:

An anti-skid pneumatic tire having a series of circumferential ribs on the tread thereof arranged at substantially equal distances apart and a series of transversely disposed ribs formed integral with the circumferential ribs at the point of intersection, said transverse ribs being spaced a greater distance apart than said circumferential ribs to form a plurality of rectangular cavities on the tread of said tire, substantially as described.

JOHN NEARY.

Witnesses:
 EARL F. MYERS,
 CARL F. SHOWALTER.